Figure 2:
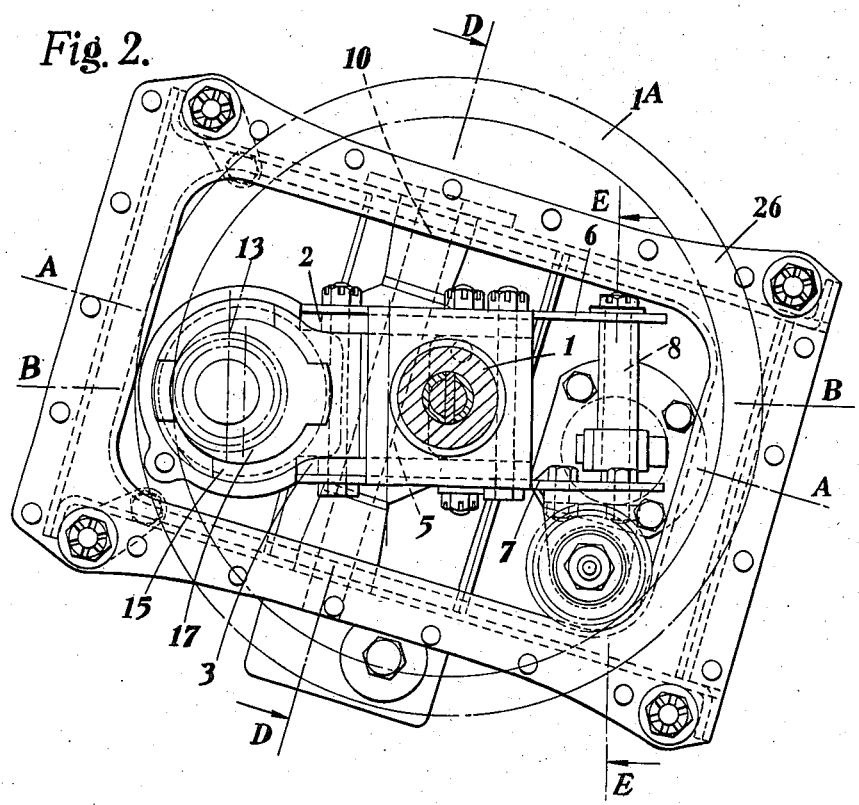

Oct. 26, 1937.    J. W. DYER ET AL    2,097,117
AIRCRAFT
Filed July 26, 1935    2 Sheets-Sheet 1
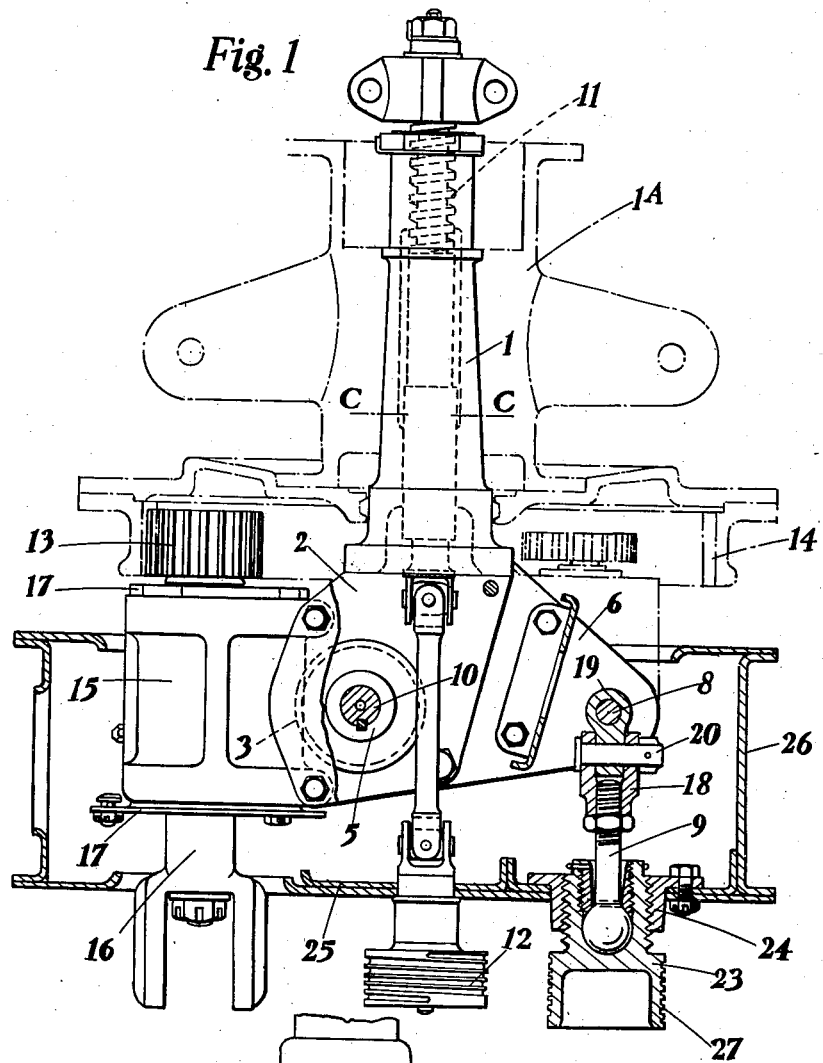
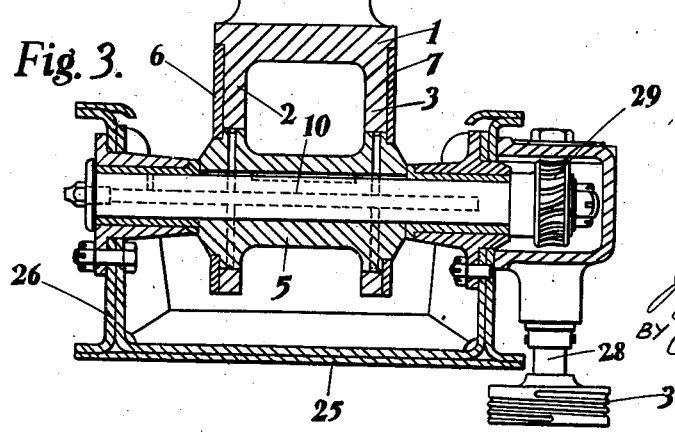

Oct. 26, 1937.   J. W. DYER ET AL   2,097,117
AIRCRAFT
Filed July 26, 1935   2 Sheets-Sheet 2

INVENTORS
J. W. Dyer,
D. Kay
BY Chas. J. Williamson
ATTORNEY

Patented Oct. 26, 1937

2,097,117

UNITED STATES PATENT OFFICE 2,097,117

AIRCRAFT

John William Dyer and David Kay, Edinburgh, Scotland, assignors to Kay Gyroplanes Limited, Edinburgh, Scotland Application July 26, 1935, Serial No. 33,395
In Great Britain July 27, 1934

13 Claims. (Cl. 244—18)

This invention relates to aircraft of the kind in which the lift is derived wholly or partly from an overhead rotative wing system, commonly referred to as a "rotor", which turns about a more or less vertical axis, and particularly to such aircraft in which the rotor is auto-rotative, i. e., rotated in flight under the action of the flight wind, although it is applicable to rotors which can be driven in flight mechanically.

In aircraft of this character it is already known to effect or assist the banking of the aircraft for a turn by mounting the rotor in such a manner as to be capable of being inclined laterally in either direction, and it is also known to provide for an inclination of the rotor in a fore-and-aft direction to enable the direction of flight to be changed from the horizontal.

For this purpose, the rotor has usually been mounted on a form of mast capable of being swung in either a lateral or in a fore-and-aft direction about its lower end.

It is found, however, that when the rotor is tilted laterally the effective angle of incidence of any rotor blade which points in a fore-and-aft direction is varied and, moreover, that the direction of such variation (i. e., whether it operates to increase or decrease the effective angle of incidence) is opposite according to whether the blade points in a fore or in an aft direction. It will be apparent, therefore, that whenever lateral tilting of the rotor is effected the longitudinal trim of the aircraft will be upset.

The primary object of this invention is to provide an arrangement whereby automatic compensation is obtained for maintaining the trim of the aircraft when the rotor is tilted laterally in either direction.

For this purpose, according to the present invention we provide in or for an aircraft of the kind referred to, the combination of means for tilting the rotor laterally of the aircraft and automatically operating means for compensating for the variation in the effective angle of incidence of the rotor blade or blades pointing in a fore-and-aft direction which is caused by the lateral tilting. More specifically we provide means for tilting the rotor laterally of the aircraft in combination with means for causing the said lateral movement to bring about a simultaneous fore-and-aft movement of the rotor. Needless to say, the direction of the fore-and-aft movement thus obtained would be such as to give the required compensation by maintaining the proper relationship between the angles of incidence of the blades when in the fore-and-aft positions respectively.

Expressed more specifically, we provide a rotor-supporting member upon which the rotor is turnably mounted and means for carrying the said member in such a manner that the member can be tilted laterally and also longitudinally of the aircraft, in combination with means for causing a simultaneous fore-and-aft movement of the said supporting member to take place when the means upon which the latter is carried is operated to tilt the rotor-supporting member laterally.

In a convenient construction, the aircraft comprises a rotor-carrying mast or the like which is pivotally mounted at its lower end for swinging movement either laterally or longitudinally in combination with means which anchors the mast or the like to a fixed part of the aircraft and is connected to the mast or the like at a position displaced or off-set from both the longitudinal and transverse pivotal axes of the mast or the like, the arrangement being such that the lateral tilting of the mast or the like takes place simultaneously with a fore-and-aft movement of the latter. The fore-and-aft inclination of the rotor can be varied either initially or whilst the aircraft is in flight under the control of the pilot independently of the actuation of the means producing lateral tilting of the rotor.

In the above construction the rotor-carrying mast or the like is provided at its lower end with a form of frame or bracket member or equivalent which is capable of rocking about its longitudinal axis (for lateral inclination of the rotor) and about its transverse axis (for fore-and-aft inclination of the rotor) and the means for anchoring the mast or the like to the fixed part of the aircraft consists of an anchoring link or the like, which is attached to the said frame or bracket or equivalent in a position off-set rearwardly of the transverse axis and also laterally of the longitudinal axis.

A further feature of the invention consists in the possibility of employing for obtaining the lateral tilting, means of the kind described in the specification of Patent 1,750,778, granted to one of the present applicants, as being used for varying the angles of incidence of airscrews, revolving blades or wings, and propellers. According to the invention described and claimed in said specification, the means for varying the angles of incidence of revolving blades and the like comprised two co-axial parts turnably arranged in hinge pin supporting means and a crank pin member on which each blade was turnably mounted, the axis of the crank pin member being inclined to the common axis of the coaxial parts.

With this arrangement (which we wish to be understood as including its various modifications) the blade is rotated substantially about its longitudinal axis so as to vary its angle of incidence with its general plane of rotation, and the plane in which the crank pin axis is inclined when in its mid-position is the general plane of rotation. In contra-distinction to this arrangement, in adapting the device for tilting the rotor in accordance with the present invention, the plane in which the crank-pin axis is inclined when the rotor is in the normal or mid-position intersects the axis of the mast, for instance, is at right angles thereto.

It will be readily appreciated that by the use of an arrangement of this sort the mast, or the frame or equivalent carrying the same, can be tilted laterally at will by rotating the co-axial parts of the crank-pin member, whilst at the same time it is free to tilt about the axis of said crank pin member (i. e., in a fore-and-aft direction).

In assembling the parts in an aircraft, it will be obvious that as the crank-pin member or equivalent is inclined to the axis of its supporting parts, either the axis of the crank pin member or that of said supporting parts can be arranged at right angles to the centre line of the machine but, in practice, it is preferred, according to the present invention, to adopt the second of these courses, since the longitudinal tilting of the mast can then take place along a line inclined to the centre line of the machine and consequently the unbalancing of the lift due to the variation in the angles of incidence of any laterally extending blades will be compensated, at least to some extent, by the shifting of the rotor centre with respect to the centre of gravity of the aircraft.

A further feature of this invention consists in utilizing the aforesaid offset anchoring link of the rotor mast as a means for altering the trim of the aircraft by varying the fore-and-aft inclination of the mast. For this purpose, said link may be attached at its lower end to an adjustable anchorage which is preferably adapted to be controlled from the cockpit of the aircraft. Said adjustable anchorage may be of any suitable form, but may conveniently comprise a bush or drum adapted to afford a universal connection with the end of the link, said bush or drum being threaded into a convenient fixed part and rotated for adjustment by a cable connected to a control in the cockpit, or in any other convenient manner.

One constructional form of the invention, applied to a rotor-supporting mast, carried on a hinge-pin or zed crank member, is hereinafter described, by way of example only, with reference to the accompanying drawings, whereon:—

Figure 4:
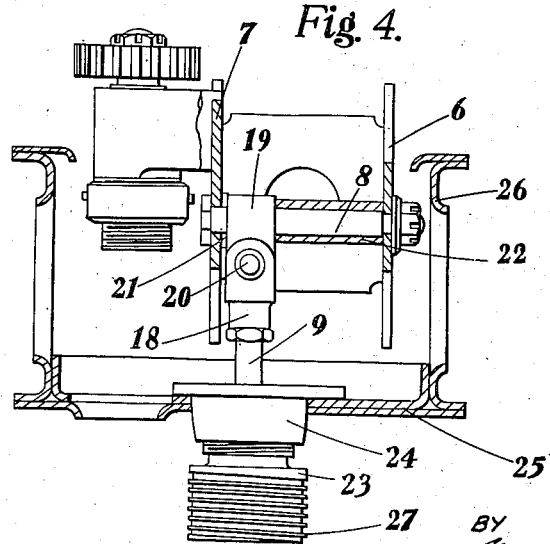

Fig. 1 is an elevation, partly in section, of part of the rotor construction and shows the method of mounting the rotor-supporting mast for lateral and fore-and-aft tilting;

Fig. 2 is a plan view on the line C—C in Fig. 1;
Fig. 3 is a section looking aft on the line D—D in Fig. 2; and Fig. 4 is an end elevation partly in section and looking forward on the line E—E in Fig. 2.

In a constructional embodiment of the invention, the hollow mast 1 on which the rotor 1A turns is forked at its lower end to form two parallel arms 2 and 3 extending vertically downwards. Said arms are pivotally carried near their front ends by the crank-pin member or barrel 5 of the zed-crank device for effecting the lateral tilting of the mast 1, and side cheeks 6 and 7 which are secured to the arms and extend rearwardly thereof are interconnected near their other ends by a cross-member 8 to which an anchoring link 9 is universally connected as described hereinafter. The axis of the axle 10 to which the crank-pin member or barrel 5 is fixed is arranged at right angles to the longitudinal centre line A—A of the aircraft, and consequently the barrel 5 itself lies at an angle thereto, and the parallel arms 2 and 3 and side cheeks 6 and 7 being at right angles to the barrel, are in turn inclined to the longitudinal centre line of the machine. The position of the mast 1 may be either vertically above or slightly behind the barrel 5, whilst the side cheeks 6 and 7 extend for a relatively substantial distance rearwardly from the point at which the mast is mounted on the barrel to that at which the anchoring link 9 is attached. It is preferred to mount the mast so that its vertical axis lies between the barrel 5 and the anchoring link 9, since in this way the load is divided more equally between these two parts. This feature is also of importance in facilitating the carrying out of the invention described in our copending application relating to the adjustment of the angles of incidence of the rotor blades. According to said co-pending application, the operating means of the incidence-control has its axis coincident with the axis of rotation of the rotor, and, comprises, in one embodiment, an actuating shaft 11, see Fig. 1, reciprocably mounted in the centre of the rotor mast 1 and coupled, as by lever and link mechanism, to the incidence-varying means. Clearly, it is desirable to leave an unobstructed space for the passage of said actuating shaft through the rotor support and, for this reason, the two inventions are preferably used in conjunction with each other. The reciprocation of the said incidence-controlling shaft may, of course, be of a purely sliding nature but in the preferred construction described it is mounted in threaded engagement with the rotor-carrying mast 1 so that rotation of the shaft in one direction or the other will cause the simultaneous vertical reciprocation of the shaft in the mast.

The rotation of the said shaft is effected in any convenient manner from a control operated by the pilot e. g., by a continuous flexible cable running over a grooved pulley 12 at the lower end of the shaft, whilst telescopic and universal joints are provided at suitable points to allow of the reciprocation and tilting movements of the shaft.

An arrangement constructed in accordance with the present invention, with or without the arrangement of the incidence-control operating means just described, can also be usefully combined with the features of the invention forming the subject of another of our co-pending applications relating to the mounting of a pinion 13, Figs. 1 and 2, for transmitting a positive drive initially to the rotor hub 1A. According to that invention, the pinion 13 is so mounted as to be capable of being swung into or out of mesh with a gear wheel 14 associated with the rotor hub, and in one form is described as being eccentrically mounted in a rotatable support 17. In combining that invention with the present one, the pinion support or outer housing 15 is carried by the lower ends of the arms 2 and 3 of the rotor mast. Thus, in an embodiment of the invention and as applied to the driving of an internally-toothed annulus 14 associated with the rotor hub 1A, the pinion is described as being carried on the upper end of the spindle 16 rotatably mounted in a housing 17 which in turn is rotatably mounted in the support 15 carried by the arms 2 and 3. The spindle 16 is arranged slightly off-centre or eccentrically in the housing 17, so that upon the latter being rotated the pinion is swung through an arc of a circle having a radius equal to the distance between its own axis and that of the support 15.

The rotation of the support or inner housing 17 may be effected in any convenient manner by the pilot. For example, a cable may be attached to its lower end and led over pulleys or the like to an operating lever or wheel in the cockpit of the aircraft, or, alternatively, it may be operated by gearing or by a suitable system of levers and links.

The eccentricity of the axis of rotation of the pinion 13 would be such that when the pinion is driving the annulus 14, the reaction between the engaging teeth will tend to force the gears deeper into mesh and, conversely, when the rotor is uncoupled from the power take-off shaft, it will tend to throw the pinion out of mesh with the gear on the annulus.

In addition to being offset rearwardly from the axis of the mast 1 the anchoring link 9 is also offset laterally from the longitudinal centre line B—B about which lateral swinging of the mast 1 takes place. Upon the upper end of the link there is screwed a fork 18 to which a block 19, slidable on the cross pin 8, is secured by means of a pin 20 passing through the fork and the shank of the said block. The block 19 is thus adjustable axially along the pin 8 so that the extent of its lateral off-setting from the centre line B—B can be varied as required. In the construction shown, the block is housed between a washer 21 and a distance tube 22 both of which can obviously be replaced by similar members of different lengths to fix the block in various positions on the pin 8. On the other hand, of course, it would be a matter of simplicity to arrange to vary the position of the block on the pin 8 initially or during flight by means under the control of the pilot, e. g., by forming a screw thread on the pin 8 and twisting the latter by any convenient form of remote control from the cockpit.

To allow lateral swinging of the mast 1 to take place the link has a ball and socket connection at its lower end with a control drum 23 threaded into a nut 24 fixed to and projecting through the base 25 of the structure 26 which carries the rotor and is mounted upon a pylon structure (not shown) fixed to the fuselage of the aircraft.

Said drum is provided at its lower end with grooves 27, on which is wound a continuous flexible cable, the two ends of which are attached to a suitable control member (in this instance, a hand wheel) in the cockpit or elsewhere. In this connection, the pitch of the grooves 27 in the drum 23 is equal to and of the same hand as that of the adjusting threads on the drum and in the nut 24, so that the take-off of the cable from the drum remains at a constant height, thus facilitating the guiding of the cable.

The rotation of the axle 10 of the crank-pin or barrel 5 for effecting the lateral tilting of the mast 1 can be carried out in any convenient manner. For example, as shown in the drawings, it is carried out by means of a rotatable shaft 28 through worm gearing 29, the said shaft being operated manually in any suitable way or it may be power operated. As shown, it is operated by the provision of a grooved drum 30 on which is wound an endless cable attached at its two ends to a control in the cockpit. On the other hand, in an alternative construction, the axle 10 is turned by a control member pivotally arranged in the cockpit and coupled to the axle by lever and link mechanism.

The operation is as follows:—

When the rotor is to be tilted, the axle 10 is turned through the above mentioned control. The axis of the barrel 5 in the neutral position of the device lies in a horizontal or substantially horizontal plane and is obliquely disposed to the axis of the axle 10 which it intersects. Secondly, the effect of a rotation of the axle 10 can be regarded as producing a movement of the barrel compounded of an oscillation about a vertical axis through the point of intersection of the axis of the axle 10 and that of the barrel and about a horizontal axis passing through the same point, whereby if the rotor were to be held by any means from moving in a fore and aft direction the effect of rotation of the barrel would be to cause the rotor mast to tilt to either side and, since the mast is offset rearwardly from the barrel, to swing bodily laterally. If the bodily movement is disregarded, lateral tilting of the rotor mast in one direction will cause one end of the pin 8 to approach the base 25 and the other end to recede from it. The link 9 by limiting such movement causes the mast to incline forwardly or rearwardly, as the case may be, as well as to tilt laterally. The partly lateral and partly fore and aft movement of the mast, therefore, is forward on one side and rearward on the other of a plane at right angles to the axis B—B and passing through the axis of the mast.

The direction of the longitudinal movement of the mast for a given direction of lateral movement of the same member depends upon the position of the anchoring link 9 and is reversed if the offsetting of said link is changed from right to left or vice versa of the axis B—B.

Actually, in the present case, in which the rotor revolves anti-clockwise as seen from below and in which the axis about which longitudinal tilting takes place is forward of the point of anchorage, the latter requires to be offset towards the port side of the aircraft.

The longitudinal swinging of the mast is a purely pivotal movement about the axis of the crank-pin member or barrel 5 and at right angles thereto, and the fore-and-aft setting of the mast can be varied by turning the threaded drum 23 to which the anchoring link 9 is connected, as described.

In the aircraft to which the specific construction above is applied, longitudinal control of the aircraft is effected in flight by the use of elevators pivoted to the tailplane.

We claim:

1. In aircraft of the kind referred to having a bladed rotor for lifting or assisting in lifting the craft, the combination of means for tilting the rotor laterally of the aircraft with means for causing the said lateral movement to cause a simultaneous fore-and-aft movement of the rotor, whereby automatic compensation is obtained for maintaining the trim of the aircraft when the rotor is tilted laterally in either direction.

2. In aircraft of the kind referred to having a bladed rotor for lifting or assisting in lifting the craft, a rotor-carrying mast or the like pivotally mounted at its lower end for swinging movement either laterally or longitudinally, in combination with means which anchors the mast or the like to a fixed part of the aircraft and is connected to the mast or the like at a position displaced or off-set from both the longitudinal and transverse pivotal axes of the mast or the like, the arrangement being such that the lateral tilting of the mast or the like takes place simultaneously with a fore-and-aft movement of the latter.

3. In an aircraft as claimed in claim 2, wherein the fore-and-aft inclination of the rotor can be varied either initially or whilst the aircraft is in flight under the control of the pilot independently of the actuation of the means producing lateral tilting of the rotor.

4. In an aircraft of the kind described having a bladed rotor for lifting or assisting in lifting the craft the combination of a rotor carrying mast provided at its lower end with a support capable of rocking about an axis extending in one direction, and also about an axis extending at substantially right angles to said axis, and means anchoring the mast to a fixed part of the aircraft, said means comprising an anchoring link which is attached to said support in a position offset laterally with respect to both of said axes about which the support rocks.

5. In an aircraft of the type described, having a bladed rotor for lifting or assisting in lifting the craft, the combination of a rotor carrying mast provided at its lower end with a support, said support being mounted to rock about an axis for giving the rotor inclination laterally of the craft and about another axis for giving inclination to the rotor substantially fore and aft of the craft, and means anchoring the mast to a fixed part of the aircraft, said means comprising an anchoring link which is attached to said support in a position offset rearwardly of the axis about which the fore and aft inclination is given to the rotor and laterally of the axis about which the said lateral inclination to the rotor takes place.

6. In an aircraft of the kind described having a bladed rotor for lifting or assisting in lifting the craft the combination of a rotor carrying mast provided at its lower end with a support capable of rocking about an axis extending in one direction and also about an axis extending at substantially right angles to said axis, and means anchoring the mast to a fixed part of the aircraft, said means comprising an anchoring link which is attached to said support in a position offset laterally with respect to both of said axes about which the support rocks, the arrangement being such that the lateral tilting of the mast takes place simultaneously with the fore-and-aft movement of the latter.

7. In an aircraft of the kind in which the lift is derived wholly or partly from an overhead rotative wing system or rotor, the combination comprising a rotor-carrying mast or the like, pivotally mounted at its lower end for tilting movement either laterally or longitudinally, and means anchoring said mast to a fixed part of the aircraft connected to the mast at a position displaced or off-set from both the longitudinal and transverse pivotal axes of the mast or the like, the arrangement being such that the lateral tilting of the mast, takes place simultaneously with a fore-and-aft movement of the latter.

8. A device as claimed in claim 7, wherein the mast is mounted for lateral and longitudinal tilting on the crank-pin or equivalent member of a hinge-pin or zed-crank member, the axis of the crank-pin or equivalent member being inclined to the axis of the co-axial bearing parts of the hinge-pin or zed-crank member.

9. A device as claimed in claim 6, wherein the lower end of the anchoring link or the like is universally jointed to a member which is mounted upon and is adjustable relatively to a structure supported by the fuselage and acting to carry the rotor system, said member being controllable to alter the fore-and-aft inclination of the rotor-carrying mast either initially or during flight under control of the pilot.

10. A device as claimed in claim 6, wherein the lower end of the anchoring link or the like is universally jointed to a drum, which is screw-threaded into a nut member secured to the aircraft structure, and the said drum is operatively connected to a control arranged in a cockpit of the aircraft.

11. A device as claimed in claim 6, wherein the lower end of the anchoring link or the like is universally jointed to a grooved drum which is screw-threaded into a nut member secured to the aircraft structure, and said grooved drum is operatively connected by means of a cable to a control arranged in the cockpit of the aircraft, the pitch of the grooves in said drum being equal to and of the same hand as that of the cooperating screw-threads on the drum and nut so that the take-off of the cable from the drum remains at a constant height.

12. A device as claimed in claim 7, wherein the rotor carrying mast is pivotally mounted at its lower end for tilting movement either laterally or longitudinally on the crank-pin or equivalent member of a hinge-pin or zed-crank member, which latter member has co-axial bearing parts arranged at right angles to the longitudinal axis of the aircraft.

13. An aircraft in which the lift is derived wholly or partly from an overhead rotative wing system or rotor, comprising in combination means for tilting the rotor laterally of the aircraft and means adapted to provide automatic compensation for maintaining the trim of the aircraft when the rotor is tilted laterally, said means acting to cause the lateral movement to bring about a simultaneous fore and aft movement of the rotor.

JOHN WILLIAM DYER.
DAVID KAY.